United States Patent
Choi et al.

(10) Patent No.: US 7,261,767 B2
(45) Date of Patent: Aug. 28, 2007

(54) AIR PURIFIER

(75) Inventors: Ho Seon Choi, Dongjak-gu (KR); In Ho Choi, Gunpo-si (KR); Ho Jung Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 10/985,932

(22) Filed: Nov. 12, 2004

(65) Prior Publication Data

US 2006/0000359 A1   Jan. 5, 2006

(30) Foreign Application Priority Data

Jul. 2, 2004   (KR) .................. 10-2004-0051612

(51) Int. Cl.
*B03C 3/62* (2006.01)
(52) U.S. Cl. .................. 96/69; 96/80; 96/88; 96/99
(58) Field of Classification Search .............. 96/69, 96/99, 97, 94, 80, 88; 95/73, 77
See application file for complete search history.

(56) References Cited

U.S. PATENT DOCUMENTS

| | | | | |
|---|---|---|---|---|
| 4,944,778 A | * | 7/1990 | Yanagawa | 96/66 |
| 5,290,343 A | * | 3/1994 | Morita et al. | 96/39 |
| 6,635,106 B2 | * | 10/2003 | Katou et al. | 96/67 |
| 2004/0129140 A1 | | 7/2004 | Park et al. | 96/59 |
| 2004/0145853 A1 | | 7/2004 | Sekoguchi et al. | 361/225 |
| 2006/0070526 A1 | * | 4/2006 | Hong et al. | 96/69 |

FOREIGN PATENT DOCUMENTS

| | | |
|---|---|---|
| EP | 1434014 | 6/2004 |
| JP | 11-310404 | 11/1999 |
| JP | 2000-219503 | 8/2000 |
| WO | WO 03/013620 A1 * | 2/2003 |
| WO | 03/028179 | 4/2003 |

OTHER PUBLICATIONS

English Language Abstract of JP 2000-219503, Aug. 8, 2000.
English Language Abstract of JP 11-310404, Nov. 9, 1999.

* cited by examiner

*Primary Examiner*—Richard L. Chiesa
(74) *Attorney, Agent, or Firm*—Greenblum & Bernstein, P.L.C.

(57) ABSTRACT

Disclosed is an air purifier having a small size so as to be easily mounted to various home appliances, and preventing ozone which is harmful to a human body from being generated, the air purifier including an insulating dielectric including a solid; a discharge electrode provided in the insulating dielectric; a ground electrode provided in the insulating dielectric and spaced for a predetermined distance from the discharge electrode; and a power supply coupled with the discharge electrode and the ground electrode for supplying a high voltage thereto.

16 Claims, 5 Drawing Sheets

AIR PURIFIER

CROSS-REFERENCE TO RELATED APPLICATIONS

This application claims the benefit of Korean Application No. P2004-51612, filed on Jul. 2, 2004, which is hereby incorporated by reference as if fully set forth herein.

BACKGROUND OF THE INVENTION

1. Field of the Invention

The present invention relates to an air purifier, and more particularly, to an air purifier having a small size and easily mounted on various kinds of home appliances, and preventing a large amount of harmful ozone from being generated.

2. Discussion of the Related Art

In general, an air purifier is often used in a living room of a general home, a car, a restaurant having many people gathered, a hospital, and an office, so as to remove dust and odor for keeping indoor atmosphere pleasant.

Although the air purifier is often used separately, it is an increasing trend that the air purifier is used as a supplementary device being mounted on a home appliance such as an air conditioner. In other words, in recent years, many home appliances are on development, having not only a cooling/heating function and a ventilating function but also an air purifying function.

FIG. 1 illustrates a diagram schematically showing a related art air purifier, and FIG. 2 illustrates a cross sectional view taken along line I-I of FIG. 1.

Referring to FIG. 1 and FIG. 2, the related art air purifier is provided with a case 10 having opened top and bottom surfaces, and a ground electrode 20 and a discharge electrode 30 provided in the case 10.

A plurality of ground electrodes 20 are provided in the case 10 at predetermined intervals, and the discharge electrode 30 is provided respectively between the ground electrodes 20. In this case, the ground electrode 20 includes a square plate, and the discharge electrode 30 includes a round wire.

An interval of more than a common number cm is maintained between the ground electrode 20 and the discharge electrode 30 each of which is connected respectively to a power supply (not shown) supplying a high voltage. A net 40 is mounted on the top and bottom surfaces of the case 10 for preventing large-sized contaminants from being entered into the case 10.

An operation of the related art air purifier structured as aforementioned is briefly described as follows. First, when a voltage is supplied to the ground electrode 20 and the discharge electrode 30 by the power supply, corona discharge that ionizes neighboring air is generated between the ground electrode 20 and the discharge electrode 30.

Owing to the corona discharge, anions and ozone are generated around an electrode, for separating contaminants contained in air and sterilizing bacteria. Therefore, the air flowed into the air purifier is purified by the anions and ozone.

In the mean time, the corona discharge is generated when the high voltage of more than 5 KV is applied to the ground electrode 20 and the discharge electrode 30. In this case, the voltage for generating the corona discharge is called an onset voltage, and the onset voltage is different according to an interval between the ground electrode 20 and the discharge electrode 30.

The related art air purifier purifies air by using the anions and ozone generated by the corona discharge. The related art air purifier, however, has problems as follows.

First, since the related art air purifier includes a plurality of ground electrodes and the discharge electrodes spaced at intervals of a number cm, there is a limitation in miniaturizing the related art air purifier. Particularly, there is a problem that a total size of a home appliance needs to be increased for securing a space for mounting the air purifier therein when the air purifier is mounted in the home appliance.

Second, the related art air purifier generates a large amount of ozone during the corona discharge. If a higher voltage is supplied to the electrode, a larger amount of ozone is generated. Although the ozone performs a role of separating organic substances in air as a substance having a very strong oxidizing power, it is harmless to a human body.

Therefore, the related art air purifier has a problem that a post-clearing process is required for removing a large amount of ozone after the corona discharge is certainly necessary.

SUMMARY OF THE INVENTION

Accordingly, the present invention is directed to an air purifier that substantially obviates one or more problems due to limitations and disadvantages of the related art.

An object of the present invention is to provide an air purifier having a small size so as to be readily mounted to various home appliances.

Another object of the present invention is to provide an air purifier for preventing ozone from being generated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air purifier includes an insulating dielectric including a solid; a discharge electrode provided in the insulating dielectric; a ground electrode provided in the insulating dielectric and spaced for a predetermined distance from the discharge electrode; and a power supply connected with the discharge electrode and the ground electrode for providing a high voltage.

In this case, the insulating dielectric is formed in a square plate form with a predetermined thickness, the power supply supplies a high frequency alternating voltage to the discharge electrode and the ground electrode, and the discharge electrode and the ground electrode are located on a same plane.

Meanwhile, the discharge electrode and the ground electrode are provided to face each other, and the discharge electrode is provided at an upper part of the insulating dielectric and the ground electrode is provided at a lower part thereof. In this instance, the discharge electrode and the ground electrode have a same size.

In this case, the discharge electrode includes a coupling member to which the power supply is supplied, and first and second electrodes being elongated respectively from both ends of the coupling member.

The first and second electrodes are elongated in a direction of lying at right angles to the coupling member. A plurality of discharge pin is provided on top surfaces of the first and second electrodes in a direction of lying at right angles to the first and second electrodes. Meanwhile, the insulating dielectric includes a ceramic.

In the mean time, in another aspect of the present invention, an air conditioner includes a cabinet; a intake formed on a front surface of the cabinet; a fan for drawing in room air through the intake into the cabinet; an indoor heat exchanger for exchanging heat of room air flowed into the cabinet; an insulating dielectric provided at the intake and includes a solid; a discharge electrode provided in the insulating dielectric; a ground electrode provided in the insulating dielectric and spaced for a predetermined distance from the discharge electrode; and a power supply coupled with the discharge electrode and the ground electrode for supplying a high voltage.

In this case, it is desirable that the insulating dielectric is provided to be parallel to a flow direction of room air flowed through the intake.

The power supply supplies a high frequency alternating voltage to the discharge electrode and the ground electrode, and the discharge electrode and the ground electrode are located on a same plane.

The discharge electrode is provided at an upper part of the insulating dielectric and the ground electrode is provided at a lower part thereof.

In this case, the discharge electrode and the ground electrode have a same area. The discharge electrode includes a coupling member to which the power supply is supplied, and first and second electrodes being elongated respectively from both ends of the coupling member.

The first and second electrodes are elongated to be perpendicular to the coupling member, and a plurality of discharge pins are provided on an upper surface of the first and second electrodes in a direction of lying at right angles to the first and second electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
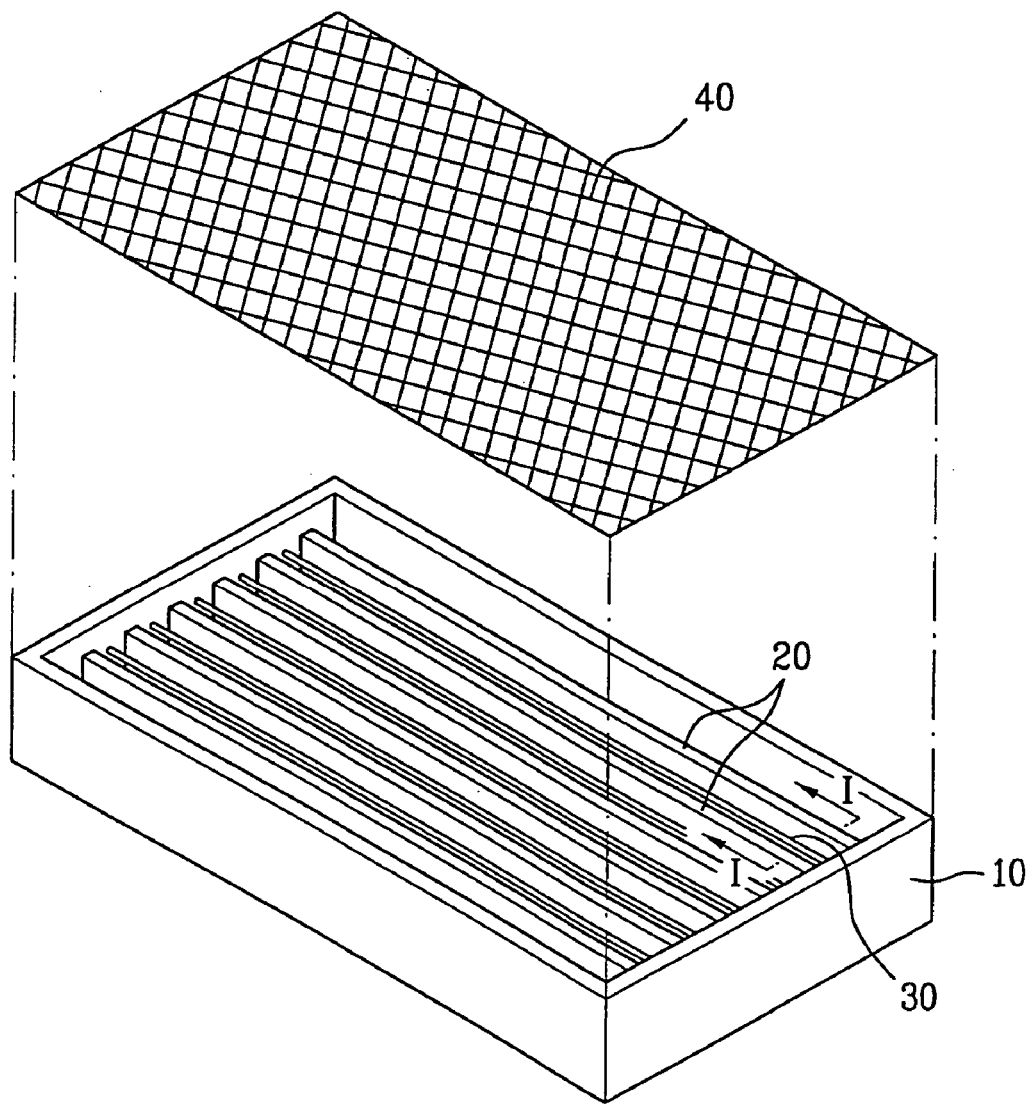
FIG. 1 illustrates a diagram schematically showing a related art air purifier.
Figure 2:
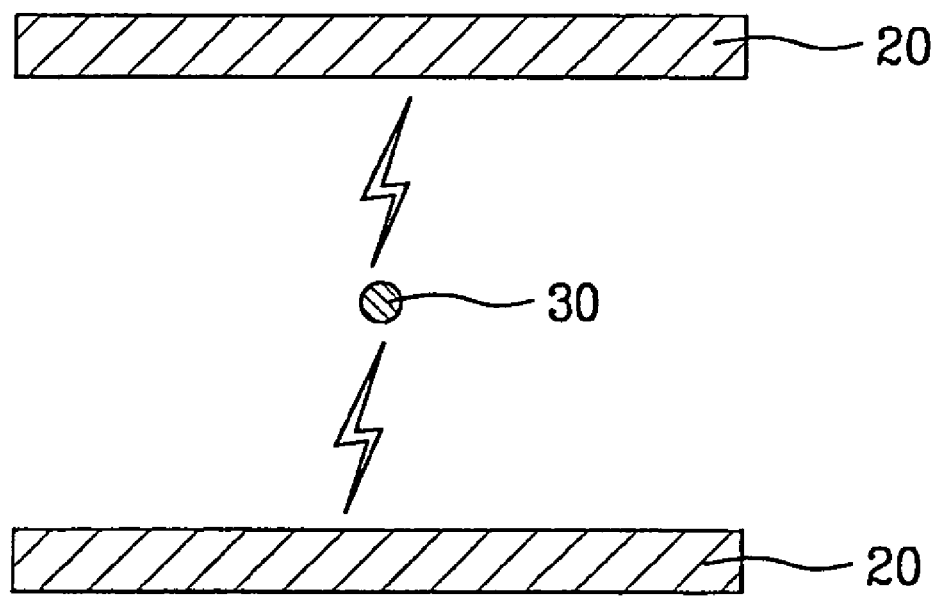
FIG. 2 illustrates a cross sectional view taken along the line I-I of FIG. 1.
Figure 3:
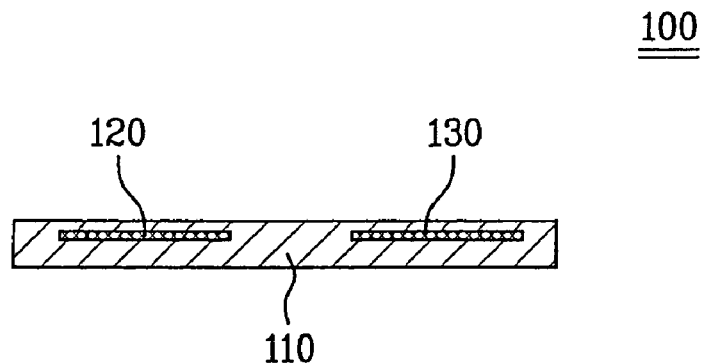
FIG. 3 illustrates a cross sectional view showing an air purifier in accordance with a first embodiment of the present invention.
Figure 4:
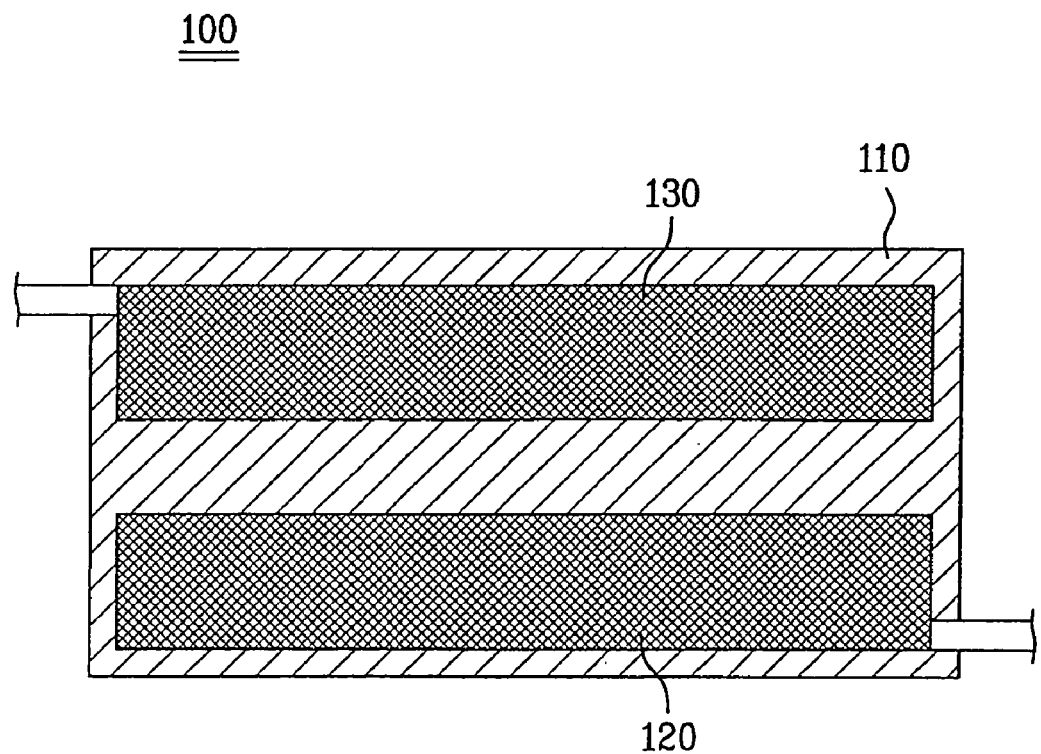
FIG. 4 illustrates a floor plan showing the air purifier in accordance with the first embodiment of the present invention.

FIG. 3 illustrates a cross sectional view showing an air purifier in accordance with a first embodiment of the present invention, and FIG. 4 illustrates a floor plan showing the air purifier in accordance with the first embodiment of the present invention.

Referring to FIG. 3 and FIG. 4, the air purifier 100 in accordance with the first embodiment of the present invention includes an insulating dielectric 110, a discharge electrode 130 and a ground electrode 120 provided in the insulating dielectric 110, and a power supply (not shown) connected with the discharge electrode 130 and the ground electrode 120 for supplying a voltage.

The insulating dielectric 110 includes a solid and is formed in the form of a square plate having a predetermined thickness. In this case, it is desirable that the insulating dielectric 110 includes, but not limiting to, a ceramic.

The ground electrode 120 and the discharge electrode 130 are spaced for a predetermined interval. Particularly, the ground electrode 120 and the discharge electrode 130 are provided in the insulating dielectric so as to be located on a same plane.

Meanwhile, the power supply supplies an alternating voltage to the ground electrode 120 and the discharge electrode 130. In this instance, it is desirable that the power supply supplies a high frequency alternating voltage to the ground electrode 120 and the discharge electrode 130 because with higher frequency of the alternating voltage supplied by the power supply, an electric discharge is more easily generated.

The air purifier in accordance with the first embodiment of the present invention is actuated as follows. First, when the power supply applies a voltage that is higher than an onset voltage respectively to the discharge electrode 130 and the ground electrode 120, insulation between the discharge electrode 130 and the ground electrode 120 is broken off and an electric discharge is generated on a surface of the insulating dielectric 110.

On the surface of the insulating dielectric 110, a plasma area is formed via the electric discharge, and ozone and a large amount of OH radical and anions are generated as well. The ozone and the large amount of OH radical and anions purify air by oxidizing and separating contaminants contained in air.

The air purifier in accordance with the present invention removes contaminants or bacteria contained in air not by using the conventional corona discharge but by using an electric discharge generated along the surface of the insulating dielectric 110.

In this case, the electric discharge generated on the surface of the insulating dielectric 110 is called a surface discharge. The surface discharge has a characteristic that an onset discharge required for the electric discharge is remarkably lower than the conventional corona discharge.

In the mean time, as aforementioned, the air purifier 100 in accordance with the present invention is often used being installed in a home appliance such as an air purifier.

Figure 5:
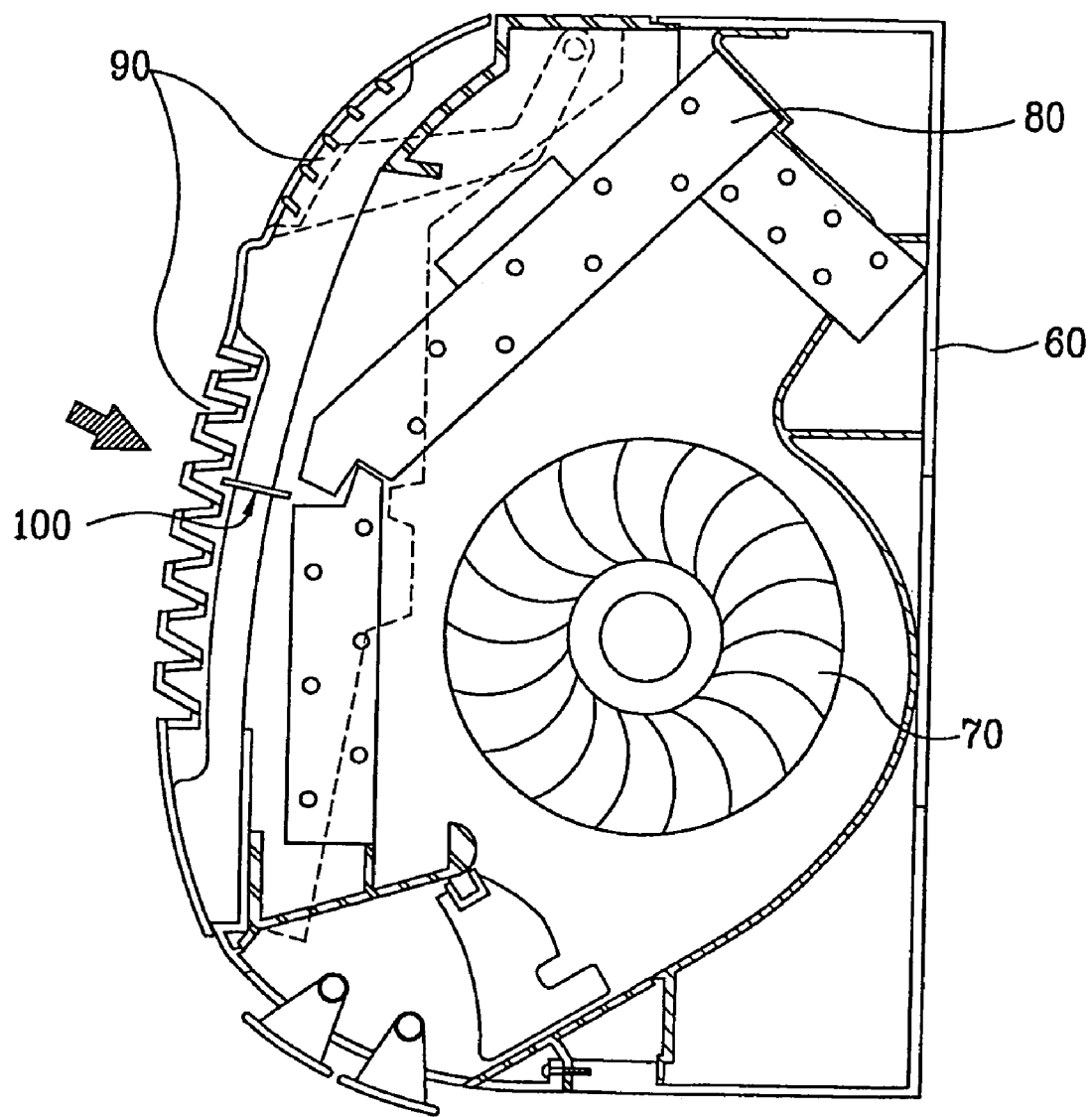
FIG. 5 illustrates a diagram showing an air conditioner provided in an air purifier in accordance with the present invention.

FIG. 5 illustrates a diagram showing an air conditioner provided in the air purifier in accordance with the present invention. Referring to FIG. 5, the air conditioner includes a cabinet 60, a fan 70, an indoor heat exchanger 80, and the air purifier 100.

An intake 90 is formed on a front surface of the cabinet 60, and the fan 70 draws in room air through the intake 90. The indoor heat exchanger 80 exchanges heat of room air flowed into the cabinet 60. The air purifier 100 includes an insulating dielectric 110, a discharge electrode 130, and a ground electrode 120.

In this case, it is desirable that the air purifier 100 is provided at the intake 90. In more detail, it is desirable that the insulating dielectric 110 is provided at the intake 90.

When the insulating dielectric 100 is provided at the intake 90, contaminants are prevented from being stuck on the indoor heat exchanger 80 or the fan 70 by purifying the room air flowed into the cabinet 60 in advance.

It is desirable that the insulating dielectric 100 is provided to be parallel to a flow of the room air flowed thorough the intake 90 such that the air is prevented from being interfered by the insulating dielectric 100.

The air conditioner purifies the air flowed through the intake 90 into the cabinet 60 by using the air purifier 100. The air purifier 100 can be mounted on various home appliances not only the air conditioner.

Figure 6:
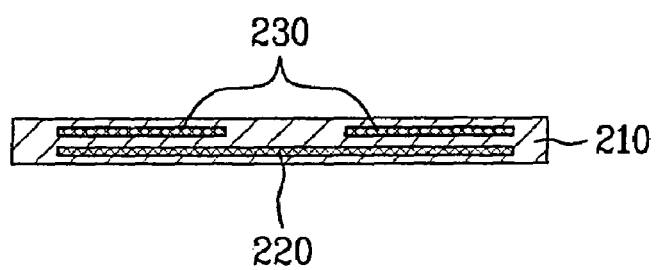
FIG. 6 illustrates a diagram showing an air purifier in accordance with a second embodiment of the present invention.
Figure 7:
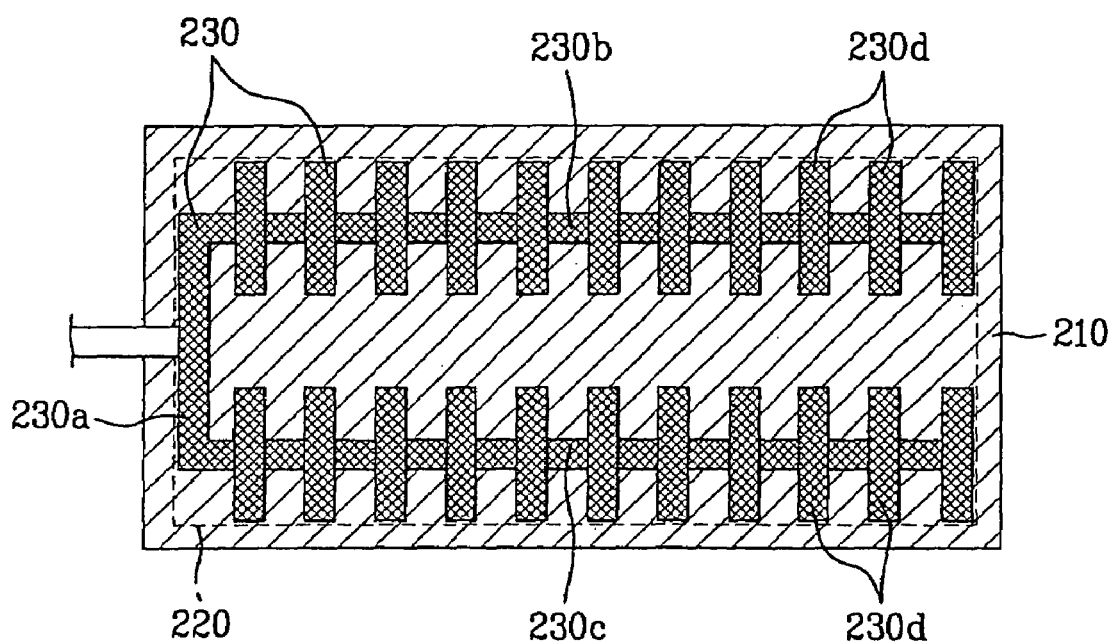
FIG. 7 illustrates a floor plan showing the air purifier in accordance with the second embodiment of the present invention.

FIG. 6 illustrates a diagram showing an air purifier in accordance with a second embodiment of the present invention, and FIG. 7 illustrates a floor plan showing the air purifier in accordance with the second embodiment of the present invention.

Referring to FIG. 6 and FIG. 7, the air purifier in accordance with the second embodiment of the present invention includes an insulating dielectric 210, a discharge electrode 230, a ground electrode 220, and a power supply.

In this case, the discharge electrode 230 and the ground electrode 220 are provided to face each other. Particularly, the discharge electrode 230 is provided at an upper part of the insulating dielectric 210, and the ground electrode 220 is provided at a lower part thereof.

When the discharge electrode 230 and the ground electrode 220 are provided up and down so as to face each other in the insulating dielectric substance 210, the surface discharge is much lively generated on the surface of the insulating dielectric 210.

In other words, compared to the first embodiment of the present invention, larger amount of ozone and OH radical and anions are generated on the surface of the insulating dielectric 210. Therefore, the structure of the discharge electrode 230 and the ground electrode 220 in accordance with the present invention is employed in a large-sized air purifier for purifying large amount of air.

It is desirable that the discharge electrode 230 and the ground electrode 220 have the same size. When the discharge electrode 230 and the ground electrode 220 are configured to have the same area, the surface discharge is more stably generated on the surface of the insulating dielectric 210.

Meanwhile, the discharge electrode 230 includes a coupling member 230a for supplying a power supply, and first and second electrodes 230b, 230c elongated respectively from both ends of the coupling member 230a. In this case, it is desirable that the first and second electrodes 230b, 230c are elongated in a direction of lying at right angles to the coupling member 230a. The structure of the discharge electrode 230 enables a smoother surface discharge by increasing a corner to which an electric charge is centered.

In addition, a plurality of discharge pins 230d are provided at an upper surface of the first and second electrodes 230b, 230c in a direction of lying at right angles to the first and second electrodes 230b, 230c. The discharge pin 230d being a part with electric charges concentrated thereon enables the surface discharge to be generated at a lower voltage. As described in the first embodiment, the air purifier in accordance with the second embodiment of the present invention is mounted to various kinds of home appliances to be used.

The air purifier in accordance with the present invention has effects as follows. First, miniaturization of an air purifier in accordance with the present invention is enabled because the discharge electrode and the ground electrode are provided in a thin insulating dielectric. Therefore, it is easily provided in a home appliance such as an air conditioner.

Furthermore, the air purifier is maximally prevented from being oxidized because the discharge electrode and the ground electrode are provided in the insulating dielectric. Therefore, the discharge electrode and the ground electrode have a much longer life than the related art.

Second, the air purifier in accordance with the present invention uses a surface discharge having an onset discharge much lower than a conventional corona discharge, thereby enabling to reduce the size of the power supply for supplying a voltage to the discharge electrode and the ground electrode.

A large amount of ozone is prevented from being generated because the onset voltage is low. Accordingly, a post-cleaning process for cleaning the ozone is not required, and a manufacturing process and parts for the ozone cleaning process is not required as well. Therefore, size and manufacturing cost of the air purifier are lowered.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An air purifier comprising:
an insulating dielectric including a solid;
a discharge electrode provided in the insulating dielectric;
a ground electrode provided in the insulating dielectric and spaced by a predetermined distance from the discharge electrode; and
a power supply connected with the discharge electrode and the ground electrode to provide an alternating voltage with high frequency,
wherein the discharge electrode and the ground electrode have a substantially same size.

2. The air purifier of claim 1, wherein the insulating dielectric comprises a square plate with a predetermined thickness.

3. The air purifier of claim 1, wherein the discharge electrode and the ground electrode are located on a same plane.

4. The air purifier of claim 1, wherein the discharge electrode and the ground electrode are provided to face each other.

5. The air purifier of claim 1, wherein the discharge electrode is provided at an upper part of the insulating dielectric and the ground electrode is provided at a lower part thereof.

6. The air purifier of claim 5, wherein the discharge electrode comprises a coupling member to which the power supply is supplied, and first and second electrodes being elongated and extending respectively from both ends of the coupling member.

7. The air purifier of claim 6, wherein the first and second electrodes are elongated in a direction of lying at right angles to the coupling member.

8. The air purifier of claim 6, wherein a plurality of discharge pins are provided on top surfaces of the first and second electrodes in a direction of lying at right angles to the first and second electrodes.

9. The air purifier of claim 1, wherein the insulating dielectric comprises a ceramic.

10. An air conditioner comprising:
a cabinet;
an intake provided on a front surface of the cabinet;
a fan that draws in room air through the intake into the cabinet;
an indoor heat exchanger that exchanges heat with room air that flows into the cabinet;
an insulating dielectric provided at the intake and including a solid;
a discharge electrode provided in the insulating dielectric;
a ground electrode provided in the insulating dielectric and spaced by a predetermined distance from the discharge electrode; and
a power supply coupled with the discharge electrode and the ground electrode to provide an alternating voltage with high frequency,
wherein the discharge electrode and the ground electrode have a same area.

11. The air conditioner of claim 10, wherein the insulating dielectric is provided to be parallel to a flow direction of room air flowing through the intake.

12. The air conditioner of claim 10, wherein the discharge electrode and the ground electrode are located on a same plane.

13. The air conditioner of claim 10, wherein the discharge electrode is provided at an upper part of the insulating dielectric and the ground electrode is provided at a lower part thereof.

14. The air purifier of claim 13, wherein the discharge electrode includes a coupling member to which the power supply is supplied, and first and second electrodes being elongated and extending respectively from both ends of the coupling member.

15. The air purifier of claim 14, wherein the first and second electrodes are elongated to be perpendicular to the coupling member.

16. The air conditioner of claim 14, wherein a plurality of discharge pins are provided on an upper surface of the first and second electrodes in a direction of lying at right angles to the first and second electrodes.

* * * * *